(12) United States Patent
Shimoyama et al.

(10) Patent No.: US 11,662,740 B2
(45) Date of Patent: May 30, 2023

(54) POSITION ESTIMATING APPARATUS, METHOD FOR DETERMINING POSITION OF MOVABLE APPARATUS, AND NON-TRANSITORY COMPUTER READABLE MEDIUM

(71) Applicant: KABUSHIKI KAISHA TOSHIBA, Tokyo (JP)

(72) Inventors: Kenichi Shimoyama, Tokyo (JP); Takuya Miyamoto, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 268 days.

(21) Appl. No.: 17/096,902

(22) Filed: Nov. 12, 2020

(65) Prior Publication Data

US 2021/0150758 A1 May 20, 2021

(30) Foreign Application Priority Data

Nov. 15, 2019 (JP) .............................. JP2019-207098

(51) Int. Cl.
| | |
|---|---|
| *G06T 7/73* | (2017.01) |
| *G05D 1/02* | (2020.01) |
| *G06T 7/246* | (2017.01) |
| *G06V 10/75* | (2022.01) |
| *G06V 20/56* | (2022.01) |

(52) U.S. Cl.
CPC ......... *G05D 1/0251* (2013.01); *G05D 1/0246* (2013.01); *G06T 7/248* (2017.01); *G06T 7/74* (2017.01); *G06V 10/751* (2022.01); *G06V 20/56* (2022.01); *G06T 2207/30252* (2013.01)

(58) Field of Classification Search
CPC .......... G06T 7/246; G06T 7/248; G06T 7/70; G06T 7/73; G06T 7/74; G06T 2207/20021; G06T 2207/30252; G06V 10/22; G06V 10/25; G06V 10/443; G06V 10/50; G06V 20/56; G05D 1/0246; G05D 1/0251

See application file for complete search history.

(56) References Cited

U.S. PATENT DOCUMENTS

| | | | |
|---|---|---|---|
| 2014/0015998 A1* | 1/2014 | Inoshita | ................... G06T 7/74 348/222.1 |
| 2019/0102912 A1* | 4/2019 | Terada et al. | ............. G06T 7/85 |

FOREIGN PATENT DOCUMENTS

| | | |
|---|---|---|
| JP | 2017-146893 A | 8/2017 |
| JP | 2017-224280 A | 12/2017 |
| JP | 2019-160147 A | 9/2019 |

OTHER PUBLICATIONS

N. Mishima et al., "Physical Cue based Depth-Sensing by Color Coding with Deaberration Network" Aug. 1, 2019 pp. 1-13, https://arxiv.org/abs/1908.00329.

* cited by examiner

*Primary Examiner* — Andrew W Johns
(74) *Attorney, Agent, or Firm* — Kim & Stewart LLP

(57) ABSTRACT

A position estimating apparatus includes a memory that stores a reference image, an interface circuit configured to communicate with a movable apparatus, and a processor. The processor is configured to, upon receipt of at least one image captured by the movable apparatus via the interface circuit, calculate an evaluation value for each of a plurality of regions of the image, and determine a current position of the movable apparatus by comparing the regions of the captured image where the calculated evaluation value exceeds a first threshold with the reference image.

20 Claims, 13 Drawing Sheets

POSITION ESTIMATING APPARATUS, METHOD FOR DETERMINING POSITION OF MOVABLE APPARATUS, AND NON-TRANSITORY COMPUTER READABLE MEDIUM

CROSS-REFERENCE TO RELATED APPLICATIONS

This application is based upon and claims the benefit of priority from Japanese Patent Application No. 2019-207098, filed Nov. 15, 2019, the entire contents of all of which are incorporated herein by reference.

FIELD

Embodiments described herein relate generally to a position estimating apparatus, a method for determining a position of a movable apparatus, and a non-transitory computer readable medium.

BACKGROUND

There is an autonomously movable apparatus that has a function of estimating its present self-position.

For example, the position is estimated by comparing a reference image captured in advance by a camera attached to the movable apparatus and associated with a known position and an image captured at the present position, and determining the positional difference of a stationary object shown in the images, such as a pattern of a ceiling.

DETAILED DESCRIPTION

When an autonomously movable apparatus captures an image for estimating its current position, if a movable object, such as a person, an automobile, a truck, a baggage, and a shelf, is present, occlusion may occur in which a stationary object to be used for position estimation, such as a ceiling or wall pattern, is hidden by such a movable object in the captured image.

When the occlusion occurs, the hidden region becomes noise in the position estimation, and the accuracy thereof may decrease.

One or more embodiments provide a position estimation technique that reduces a decrease in accuracy of position estimation due to existence of a movable object.

According to one embodiments, a position estimating apparatus includes a memory that stores a reference image, an interface circuit configured to communicate with a movable apparatus, and a processor. The processor is configured to, upon receipt of at least one image captured by the movable apparatus via the interface circuit, calculate an evaluation value for each of a plurality of regions of the image. The processor is further configured to determine a current position of the movable apparatus by comparing the regions of the captured image where the calculated evaluation value exceeds a first threshold with the reference image.

Hereinafter, one or more embodiments will be explained with reference to the drawings.

Figure 1:
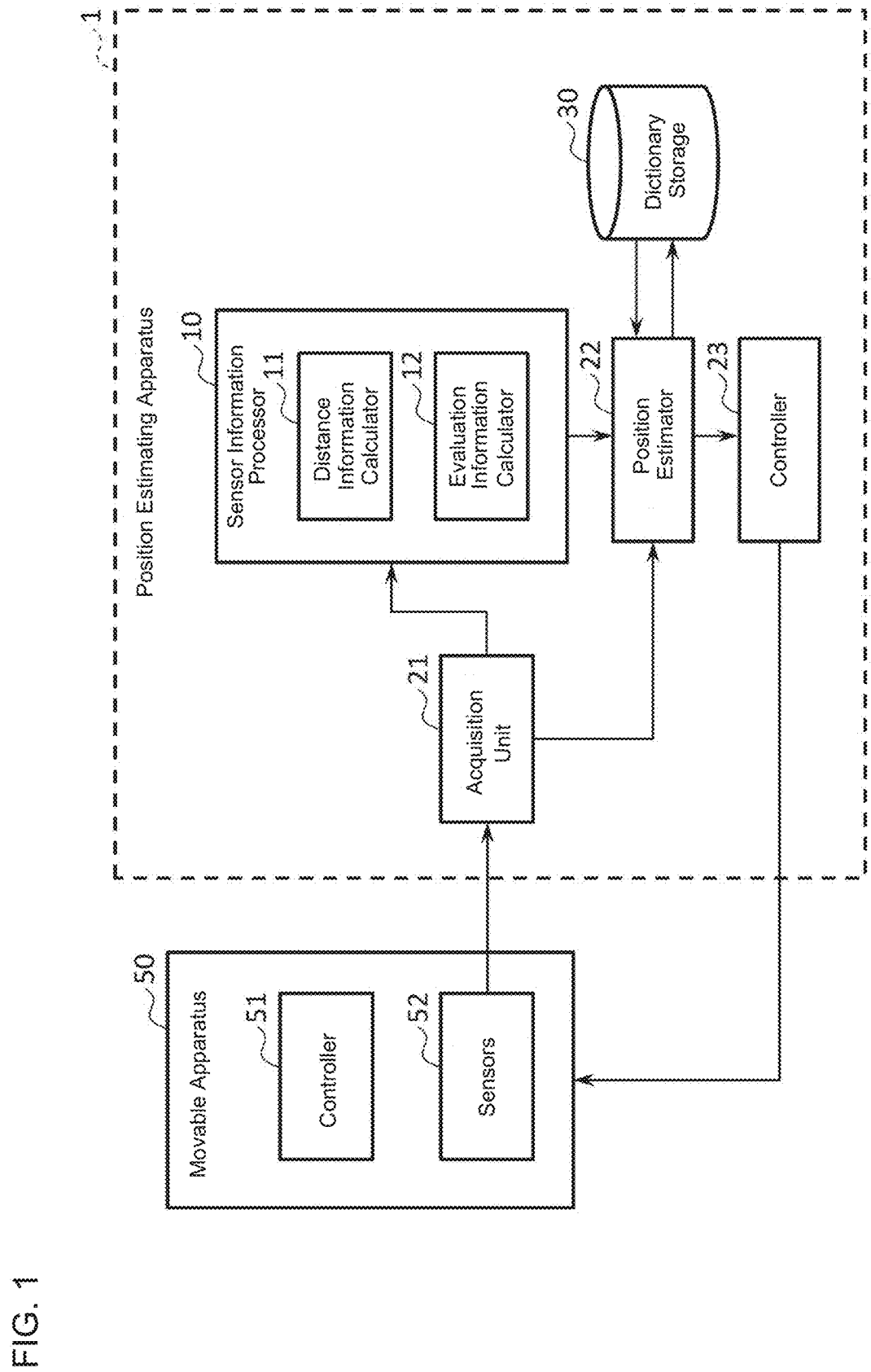
FIG. 1 is a block diagram showing a system including a position estimating apparatus and a movable apparatus according to an embodiment.

FIG. 1 is a block diagram showing a position estimating system according to one embodiment. This system includes a position estimating apparatus 1 and a movable apparatus 50. The position estimating apparatus 1 is configured to communicate with the movable apparatus 50.

The movable apparatus 50 includes a controller 51 and one or more sensors 52. Although it is not shown in figure, the movable apparatus 50 has a moving mechanism such as wheels and motors.

The controller 51 controls the moving mechanism to move the movable apparatus 50. For example, the controller 51 controls the drive mechanism for moving the movable apparatus 50 to a designated target position.

The sensors 52 include various kinds of inner sensors and external sensors equipped in the movable apparatus 50, and outputs various kinds of sensor information. The inner sensor is a sensor configured to output information relevant to a state of the movable apparatus 50. According to an embodiment, the inner sensor mainly outputs information relevant to a motion of the movable apparatus 50. On the other hand, the external sensor is a sensor configured to output information about a surrounding environment of the movable apparatus 50. In an embodiment, the external sensor mainly outputs images of the exterior of the movable apparatus 50.

The position estimating apparatus 1 is configured to estimate the position of the movable apparatus 50 based on sensor information that is output from the movable apparatus 50. The position estimating apparatus 1 may be a host system which controls moving of the movable apparatus 50 based on an estimation result of the position of the movable apparatus 50. The position estimating apparatus 1 is a personal computer (PC), for example. The position estimating apparatus 1 includes hardware described in FIG. 2 and has functions of an acquisition unit 21, a sensor information processor 10, a position estimator 22, a controller 23, and a dictionary storage 30.

The acquisition unit 21 acquires sensor information from the sensors 52 of the movable apparatus 50. For example, the acquisition unit 21 takes out the sensor information based on signals that are output from the movable apparatus 50.

The sensor information processor 10 processes the sensor information acquired by the acquisition unit 21. The sensor information processor 10 includes a distance information calculator 11 and an evaluation information calculator 12.

The distance information calculator 11 calculates a distance to an object which exists around the movable apparatus 50 based on the sensor information obtained by the acquisition unit 21.

The evaluation information calculator 12 calculates an evaluation value representing a suitability degree based on the distance information calculated by the distance information calculator 11 or the sensor information. In an embodiment, the evaluation information calculator 12 calculates the evaluation value for each unit region of the image as evaluation information based on the image included in the sensor information and the distance information corresponding to the image. Here, the suitability degree indicates to what extent the acquired distance information or sensor information is suitable for position estimation. Hereinafter, the term "suitability degree" is used interchangeably with "the evaluation value" or "the evaluation information."

The position estimator 22 estimates the position of the movable apparatus 50 based on the distance information, the sensor information, and/or the evaluation information. In an embodiment, the position estimator 22 estimates the position and the posture of the movable apparatus 50 by comparing an image captured around the movable apparatus 50 with an image in a vicinity of the target position stored in the dictionary storage 30.

The controller 23 generates and outputs a signal to control operations of the movable apparatus 50 according to the position posture of the movable apparatus 50 estimated by the position estimator 22.

The dictionary storage 30 stores a dictionary holding an image of the target position of the movable apparatus 50 and a plurality of images captured at a plurality of capturing positions around the target position. The dictionary further holds feature points and feature amounts extracted from the respective images, a correspondence relationship between the respective images, and information about positions where the respective images are captured, which are used for position estimation by the position estimator 22.

Figure 2:
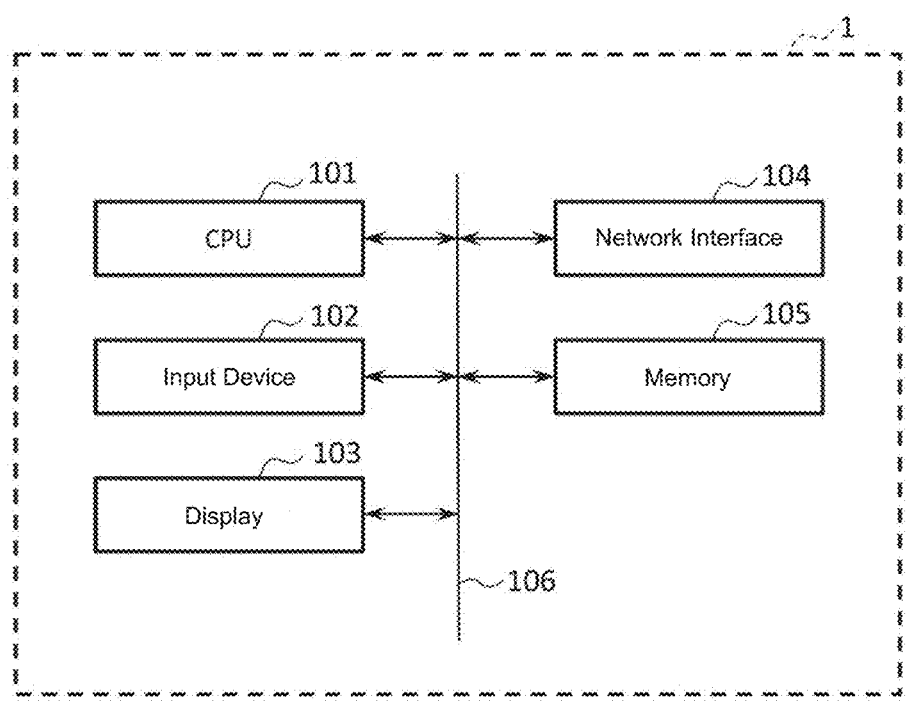
FIG. 2 is a hardware block diagram of the position estimating apparatus.

FIG. 2 shows an example of hardware structure of the position estimating apparatus 1 according to an embodiment. The position estimating apparatus 1 includes a central processing unit (CPU) 101, an input device 102, a display 103, a network interface 104, and a memory 105, for example. The CPU 101, the input device 102, the display 103, the network interface 104, and the memory 105 are connected to a bus 106.

The CPU 101 is a processor which controls overall operation of the position estimating apparatus 1. For example, the CPU 101 operates as the acquisition unit 21, the sensor information processor 10, the position estimator 22, and the controller 23 by executing a program(s) stored or loaded in the memory 105. The CPU 101 may be a microprocessor (MPU), a graphical processing unit (GPU), an application-specific integrated circuit (ASIC), a field-programmable gate array (FPGA), etc. The CPU 101 may be a single processor or may be comprised of multiple processors.

The input device 102 is an input device, such as a joystick, a touch panel, a keyboard, and a mouse. When operation of the input device 102 is carried out, the signal according to operation information is inputted into the CPU 101 via the bus 106. The CPU 101 performs various kinds of processing according to this signal.

The display 103 is a display, such as a liquid crystal display and an organic electroluminescence display. The display 103 can display various kinds of images.

The network interface 104 is an interface circuit for wireless LAN communication, for example. The network interface 104 communicates with the movable apparatus 50. The network interface 104 may not necessarily be such an interface circuit for wireless LAN communication.

The memory 105 includes is a volatile memory, such as a random access memory (RAM), a non-volatile memory, such as a read only memory (ROM), and/or a storage device, such as a hard disk drive (HDD) and a solid state drive (SSD). The memory 105 operates as the dictionary storage 30. The memory 105 may store various kinds of programs run by the CPU 101.

The bus 106 is a data transfer path for an exchange of data between CPU 101, the input device 102, the display 103, the network interface 104, and the memory 105.

Hereinafter, more details about each structure shown in FIG. 1 are explained.

The movable apparatus 50 shown in FIG. 1 is an automated guided vehicle (AGV), for example. The AGV is a trackless vehicle that automatically travels to an instructed cargo loading place and transports a cargo loaded by a person, an automatic robot, or the like at the cargo loading place to an instructed unloading place. The movable apparatus 50 can include any drive mechanism. For example, the movable apparatus 50 may have a two-wheel-drive mechanism, may have a four-wheel-drive mechanism, and may have a caterpillar mechanism. The movable apparatus 50 may be a bipedal or multi-pedal apparatus or an apparatus having flight ability. The movable apparatus 50 may not be trackless and may be a movable apparatus having a line tracing system which moves along a designated orbit. In this disclosure, the movable apparatus 50 is an AGV unless otherwise described.

The controller 51 receives a command of moving and controls the drive mechanism in order to move the movable apparatus 50 to a specified target position. At this time, the controller 51 can recognize its own position based on the position estimated by the position estimating apparatus 1, and control the drive mechanism by determining a direction and a distance required to move toward the designated target position.

The command of moving and the target position of the movable apparatus 50 may be given from the position estimating apparatus 1 as the host system of the movable apparatus 50, may be set in advance, or may be input by people directly. The target position may include not only a spatial position of the movable apparatus 50 but the posture of the movable apparatus 50 in the target position.

Unless otherwise described in this disclosure, the position and posture of the sensor mounted in the movable apparatus 50 shall be the position and posture of the movable apparatus 50. When the target position is designated, not only coordinates of the designated specific position, but also areas such as "place of A" and "work area of B" may be designated by using information such as a map of the work area.

The command of moving may be not only a command which specifies an absolute position but a command which specifies the relative position from the present position of the movable apparatus 50. For example, the command of moving may specify a position by the following command: "go straight for 1 meter and turn thirty degrees clockwise. On the occasion of moving to a predetermined place, its route may be important. For example, there is a case where the movable apparatus 50 cannot move linearly to a predetermined position simply because of an obstacle. The controller 51 may determine the route of moving, and the route of moving may be given by the host system. The route of moving may be set in advance, or may be input by people directly.

An operation command of data acquisition for the movable apparatus 50 may be sent from the controller 51 or the host system (for example, position estimating apparatus 1). Alternatively, the data may be acquired according to a human operation. When the movable apparatus 50 approaches a vicinity of a predetermined position, the data acquisition may be performed. The vicinity of the predetermined position refers to, for example:

(A1) a work area where a carriage is placed, a place where a carriage is lowered, or a place where a work robot mounted on the movable apparatus 50 performs a particular operation;

(A2) a charging place where the battery of the movable apparatus 50 can be charged; and (A3) an intersection.

Alternatively, the data acquisition may be performed according to a particular motion of the movable apparatus 50, for example:

(B1) when the movable apparatus 50 stops;

(B2) when the speed of the movable apparatus 50 decreases;

(B3) When the movable apparatus 50 turns (for example, before and after turning a corner)

(B4) when the movable apparatus 50 is moving at a constant speed for a fixed time; or (B5) when the movable apparatus 50 makes a motion to avoid obstacles and other AGVs.

That is, when the movable apparatus 50 makes a specific motion, the operation command for data acquisition instruction may be sent.

Further, the sensor of the movable apparatus 50 may be always turned on so as to acquire data in response to a timing specified by the data acquisition command. Alternatively, the sensor may be configured to turn on only when the data acquisition command is received.

The internal sensor of the sensors 52 includes, for example, an angular velocity sensor, such as a rotary encoder, an acceleration sensor, or a gyro sensor. The movement amount and posture of the movable apparatus 50 can be measured by these internal sensors. The approximate position of the movable apparatus 50 can be obtained from the movement amount and posture of the movable apparatus 50.

The external sensor of the sensors 52 captures an image of the outside of the movable apparatus 50. It is preferable that the external sensor can acquire sensor information about the outside of the movable apparatus 50 in addition to the image, e.g., a distance to each object around the movable apparatus 50. More preferably, the external sensor can measure or calculate such a distance around the movable apparatus 50 in a plane. For example, a depth camera, 3D light detecting and ranging (LiDAR), or the like can be used to acquire a planar distance image. The distance image is an image generated by converting a distance value into a luminance value. The depth camera may be of any type such as a ToF (Time of Flight) type or a pattern irradiation type.

Further, even if the external sensor is a laser rangefinder of a line-measurement type or the like, a planar distance image can be acquired by mechanically changing the measurement direction or changing the measurement directions of a plurality of laser rangefinders. Further, as a method of non-direct measurement, a stereo camera, a monocular camera, or the like may be used. The stereo camera can convert an acquired image into distance information by a stereo matching method. Even in the case of the monocular camera, stereo photographing similar to that of the stereo camera can be performed by changing the position and posture of the movable apparatus 50 to calculate distance information. Any other external sensors may be used. In this disclosure, unless otherwise specified, a stereo camera is used as the external sensor.

Figure 3:
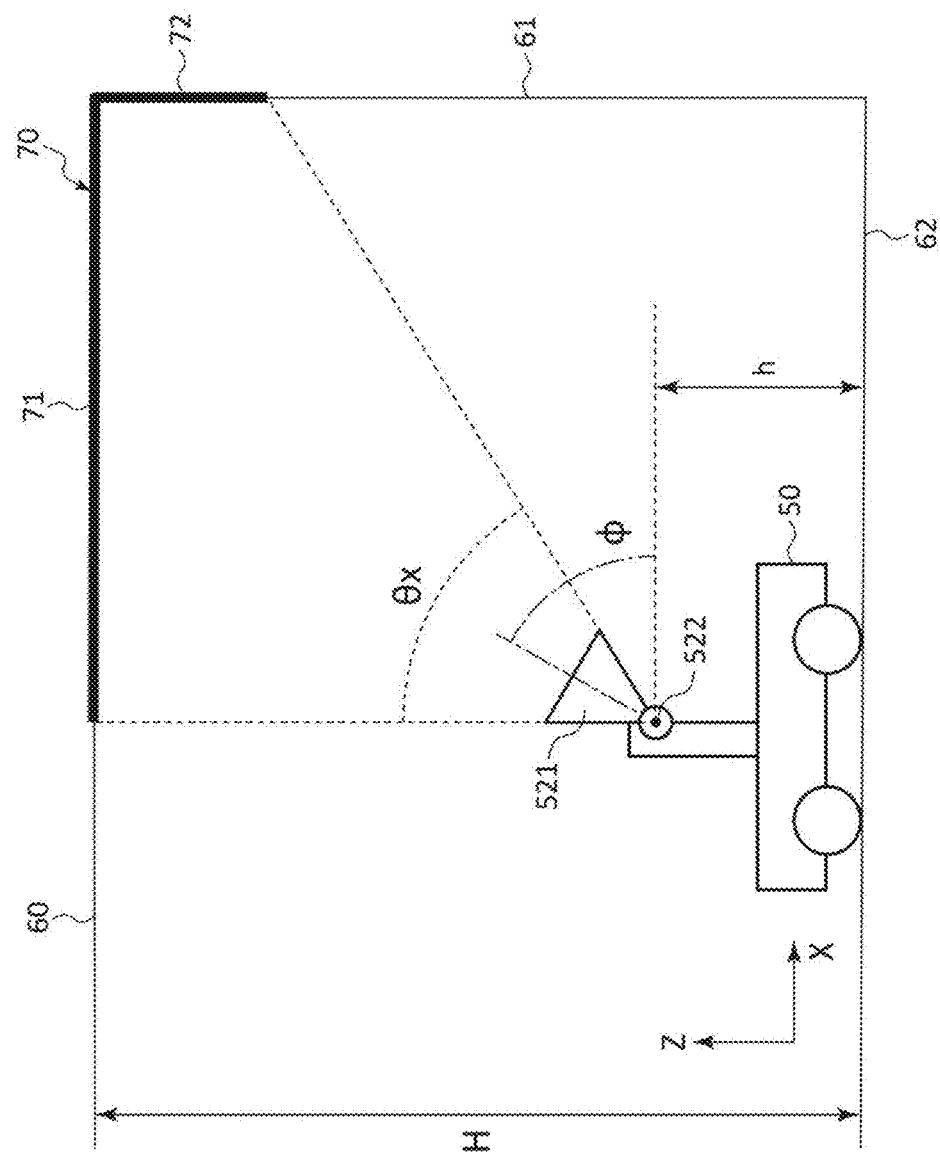
FIG. 3 is a diagram showing a sensor of the movable apparatus.

FIG. 3 shows an arrangement example of the stereo camera. In FIG. 3, a stereo camera 521 is installed at the center of the upper surface of the movable apparatus 50. The stereo camera 521 is installed such that its optical center 522 is at a height h from a floor 62. The optical axis of the stereo camera 521 is inclined by an angle φ with respect to the floor 62. The angle of view of the stereo camera 521 is represented by θx. Here, the imaging range 70 of the stereo camera 521 includes an imaging range 71 mainly including a ceiling 60 located at the height H from the floor 62. As shown in FIG. 3, when the movable apparatus 50 is approaching the wall 61, the imaging range 70 of the stereo camera 521 includes the imaging ranges 71 and 72 including the ceiling 60 and the wall 61. The imaging range 70 of the stereo camera 521 may be changed depending on the application of the images acquired by the stereo camera 521. For example, in order to estimate the position of movable apparatus 50, the subject in the image collected by the stereo camera 521 preferably varies only depending on the position of movable apparatus 50 and does not vary in time. As shown in FIG. 3, by setting the imaging range 70 of the stereo camera 521 to the imaging ranges 71 and 72 that can include the ceiling 60 and the wall 61, images suitable for estimating the position of the movable apparatus 50 can be acquired with little temporal variation of the subject. Of course, the installation position and direction of the stereo camera 521 are not limited to those shown in FIG. 3.

Next, the sensor information processor 10 and the position estimator 22 is further described.

The sensor information processor 10 first acquires an image of the surrounding environment of the movable apparatus 50 from the sensor information acquired by the acquisition unit 21. The sensor information processor 10 also obtains or calculates distance information from the sensor information. Next, the sensor information processor 10 calculates an evaluation value indicating the suitability for each unit region of the image based on the distance information, and outputs the evaluation value to the position estimator 22. The position estimator 22 specifies one or more regions having an evaluation value higher than a predetermined threshold value in the image, and estimates the position/posture of the movable apparatus 50 based on the specified regions. In an embodiment, the position estimating apparatus 1 estimates the position of the movable apparatus 50 mainly based on the sensor information acquired by the external sensor of the movable apparatus 50. However, the position estimating is not limited thereto, the sensor information acquired by the internal sensor may be used together.

The distance information calculator 11 acquires or calculates distance information from the sensor information acquired by the acquisition unit 21. In an embodiment, the distance information calculator 11 calculates the distance information by stereo matching from left and right camera images captured by the stereo camera 521 as the sensor information.

The evaluation information calculator 12 calculates an evaluation value indicating the suitability of the image for each unit region of the image based on the distance information calculated by the distance information calculator 11. The evaluation is performed in unit of pixel or region of the image, and the evaluation value is lower as the distance from the camera is shorter, and the evaluation value is higher as the distance from the camera is longer.

In general, a position estimation is performed by acquiring a distance from each stationary object. In an embodiment, a ceiling, a wall surface, or the like whose position does not change is used as the stationary object. However, at the time of capturing an image, an movable object, such as a person, an automobile, a truck, a baggage, a shelf, or the like, whose position may change, may be shown in the image. Since the position of such a movable object changes, there is a high possibility that the movable object may be a noise source for position estimation. The movable object is usually shown in front of the ceiling or the wall in the captured image. Since an object with a short distance from the camera may be considered to be the movable object, the evaluation value is lowered as the distance becomes shorter.

Next, dictionary storage 30 is described. The dictionary storage 30 stores a reference dictionary in which target position information required by the sensor information processor 10 and the position estimator 22 is registered. Examples of the registration information of the reference dictionary include the following:

(a) an image of the target position and its surrounding images;
(b) feature points and feature amounts of the target position image and its surrounding images;
(c) an association result between the registered images;
(d) the target position and the position of each surrounding image; and
(e) a speed of the movable apparatus 50 at the time of capturing the image of the target position.

When there are a plurality of target positions, there are two registration methods for preparing the reference dictionary: (1) a method of collectively registering registration information for all target positions into one dictionary, and (2) a method of dividing the registration information into a different dictionary for each target position.

In the method (1), although it is not necessary to select the dictionary, since it is necessary to perform matching of feature points for all of the images registered in the reference dictionary, it takes time to perform the process of estimating the position. In the method (2), since only the process for the reference dictionary in which the necessary target position is registered is required, it takes less time to perform the process for estimating the position. On the other hand, in the method (2), it is necessary to designate one of the reference dictionaries to be used by a host system, a person, or the like. Thus, the reference dictionary registration methods (1) and (2) have merits and demerits. Therefore, it is preferable that the reference dictionary registration methods (1) and (2) are selectively used as necessary.

Figure 4:
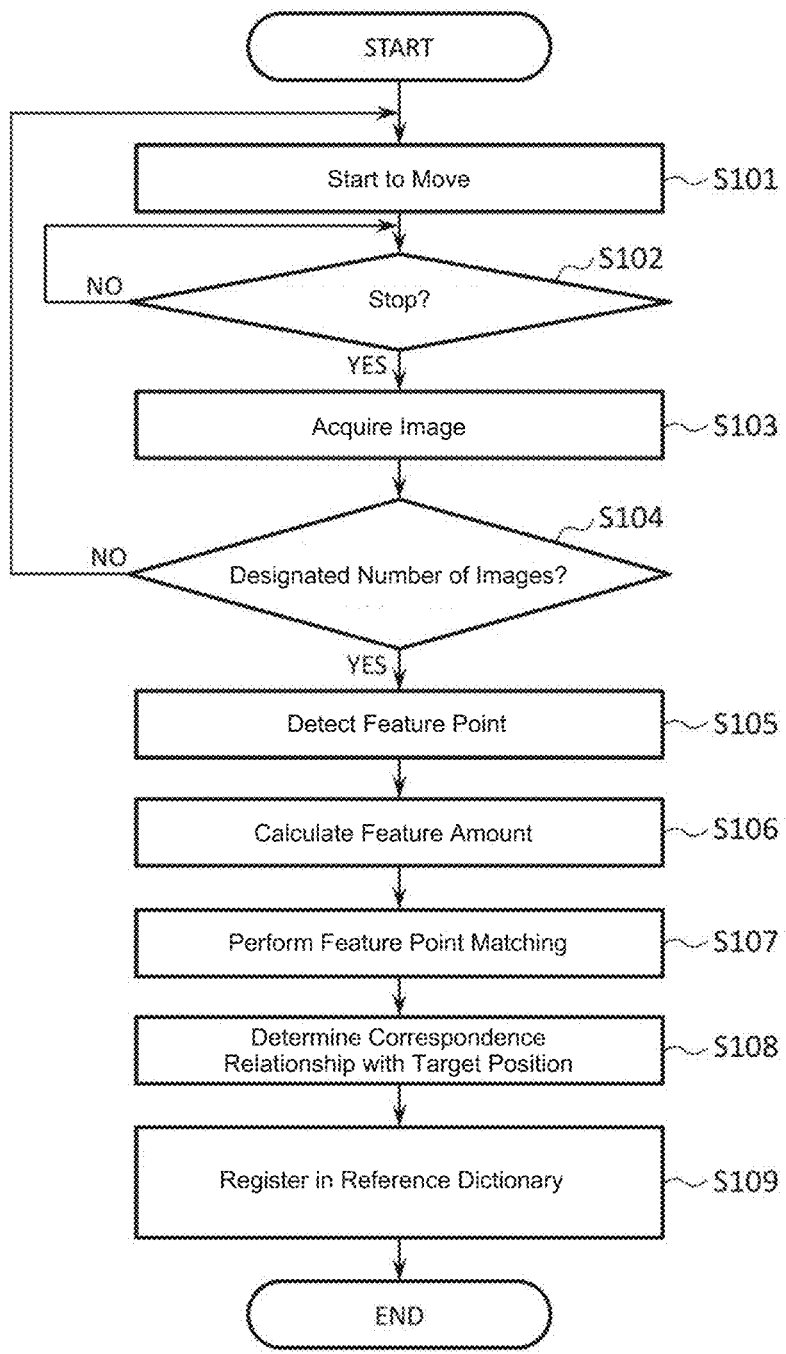
FIG. 4 is a flow chart showing process of generating a reference dictionary according to an embodiment.

FIG. 4 is a flowchart showing a process of generating the reference dictionary. The process of FIG. 4 is performed prior to the estimation of the position.

In step S101, the controller 23 of the position estimating apparatus 1 instructs the movable apparatus 50 to proceed towards one of designated positions. The designated positions include the target position and capturing positions around the target position. The controller 23 selects one of the positions and instructs the moving mechanism to move the movable apparatus 50. The movable apparatus 50 may be controlled manually by a joystick or the like.

In step S102, the controller 23 determines whether or not the movable apparatus 50 has stopped from the sensor information acquired by the acquisition unit 21. For example, the controller 23 calculates the speed of the movable apparatus 50 from the sensor information acquired by the acquisition unit 21, and determines that the movable apparatus 50 has stopped when the calculated speed is equal to or less than a threshold value. Here, the stop of the movable apparatus 50 is not limited to the arrival at the target position or the capturing position. For example, the movable apparatus 50 may be configured to stop at a corner or the like before moving toward the target position or the capturing position. Also in this case, when the speed of the movable apparatus 50 is equal to or less than the threshold value, it is determined that the movable apparatus 50 has stopped in the determination of step S102. In step S102, the process waits until it is determined that the movable apparatus 50 has stopped. If it is determined in step S102 that the movable apparatus 50 has stopped, the process proceeds to step S103.

In step S103, the controller 23 instructs the movable apparatus 50 to capture an image so that the acquisition unit 21 can acquire the image from the movable apparatus 50.

In step S104, the controller 23 determines whether or not the designated number of images have been acquired. For example, the controller 23 determines that the designated number of images are acquired when the images of the target position and all the capturing positions are acquired. In step S104, when the designated number of images have not been acquired, that is, when there remains a capturing position at which no image has been acquired, the process returns to step S101. In this case, the controller 23 designates a new capturing position and instructs the movable apparatus 50 to move further towards that position. In step S104, when it is determined that the designated number of images have been acquired, the process proceeds to step S105.

In step S105, the position estimator 22 detects feature points from each acquired image. The position estimator 22 may detect the feature points by using SIFT (Scale Invariant Feature Transform), AKAZE (Accelerated KAZE), or the like.

In step S106, the position estimator 22 calculates a feature amount from the detected feature points. The position estimator 22 may calculate the feature amount according to the method used for the feature point detection.

In step S107, the position estimator 22 performs feature point matching between the image of the target position and the image of each capturing position. Specifically, the position estimator 22 associates the feature points of the images with each other so that the difference between the feature amounts is minimized. The position estimator 22 may perform feature point matching by a method such as NN (Nearest Neighbor), k-NN, kd-tree, or Hamming distance, or the like.

In step S108, the position estimator 22 determines the correspondence relationship between the image of the target position and the image of each capturing position. For example, the position estimator 22 determines the relative position and the relative posture of the movable apparatus 50 at each capturing position with respect to the target position from the correspondence relation between the feature points of the image of the target position and the image of the capturing position. Then, the position estimator 22 generates three dimensional information for each image by the principle of triangulation using the estimated relative position and relative posture.

In step S109, the position estimator 22 registers the feature point and the feature amount of each image, the correspondence relationship of the image of each capturing position with respect to the image of the target position, the coordinates of the target position and the capturing position, the speed of the movable apparatus 50 at the time of capturing, and the like in the reference dictionary.

Figure 5:
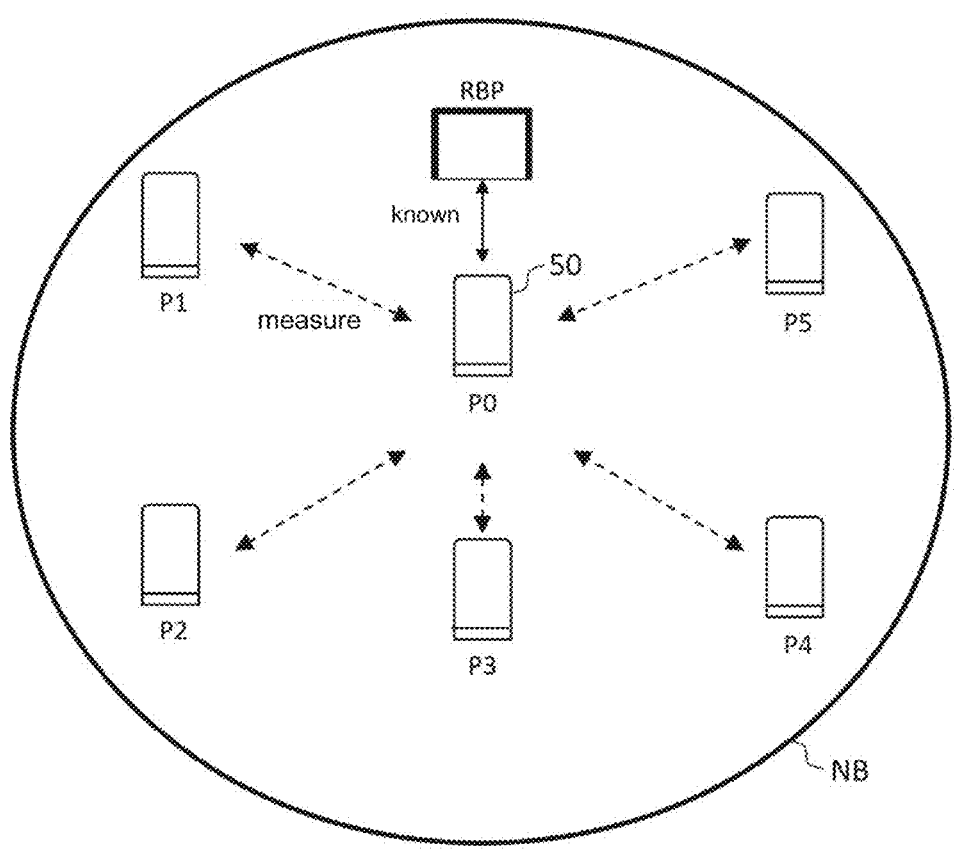
FIG. 5 is a diagram showing positions for capturing images registered in the reference dictionary.

FIG. 5 is a diagram showing an example of the capturing position of the images registered in the reference dictionary according to the processing of FIG. 4. In FIG. 5, a position immediately before the position RBP of the movable apparatus 50 is set as a target position P0. Positions P1, P2, P3, P4, and P5 around the target position P0 are capturing positions. At each of the capturing positions P1, P2, P3, P4, and P5, the stereo camera is directed toward the target position P0 to capture an image. The target position P0 is a known position given by, for example, a host system or the like. On the other hand, the capturing positions P1 to P5 are positions that are measured each time an image is captured at each position.

Here, the number of images registered in the reference dictionary, that is, the number of capturing positions is not limited to a specific value. Further, the positional relationship between the target position and each capturing position may be any relationship in principle. In practice, it is desirable that each capturing position is located within a range NB in the vicinity of the target position.

The position estimator 22 determines the position of the movable apparatus 50 by comparing the image acquired by the acquisition unit 21 with the images registered in the reference dictionary of the dictionary storage 30.

Figure 6:
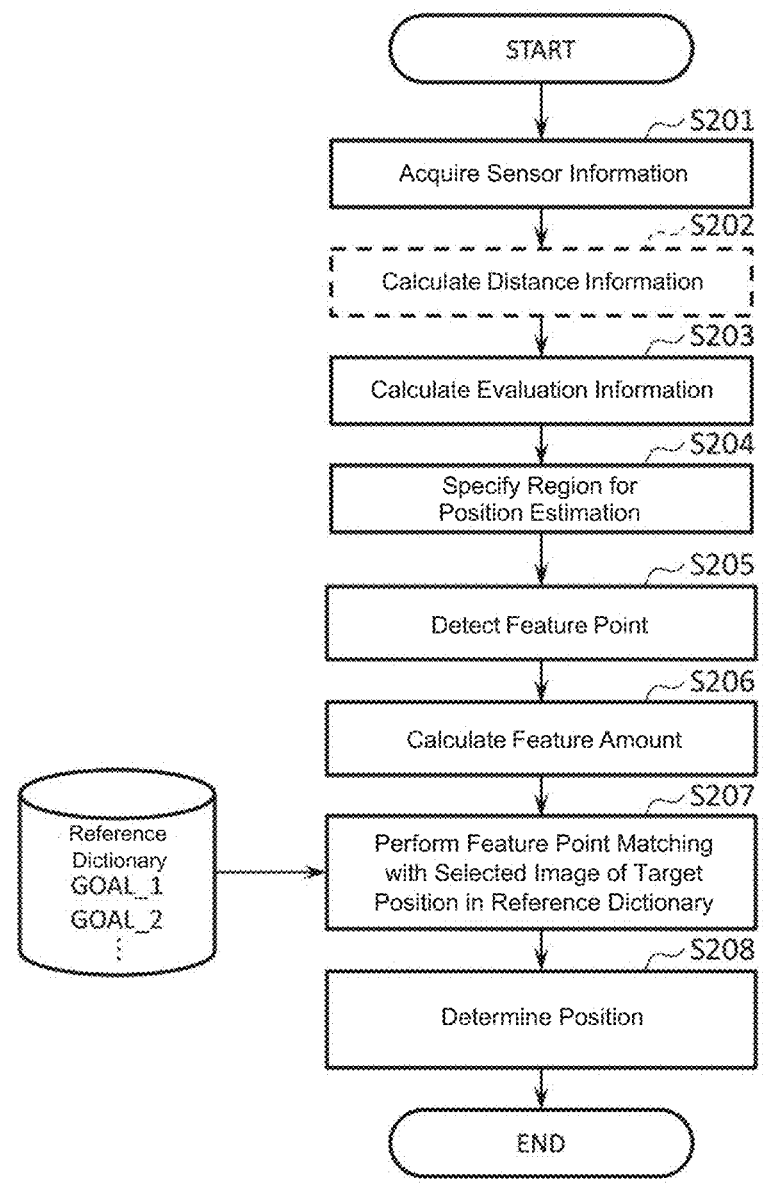
FIG. 6 is a flow chart showing a position estimating process according to an embodiment.

FIG. 6 is a flowchart of the position estimation processing by the position estimating apparatus 1 configured as described above.

First, in step S201, the acquisition unit 21 acquires sensor information, for example, an image captured by the stereo camera 521, from the sensors 52 of the movable apparatus 50. For example, the acquisition unit 21 acquires the sensor information from the sensors 52 of the movable apparatus 50 at regular intervals, and passes the sensor information to the sensor information processor 10.

Next, in step S202, the distance information calculator 11 of the sensor information processor 10 calculates distance information from the sensor information. In an embodiment, the distance information calculator 11 calculates, the distance information by stereo matching from left and right camera images captured by the stereo camera 521 as the sensor information. As described above, in a case where the sensor is a depth camera, 3D-LiDAR, or the like, the distance information is obtained as the sensor information, and thus the process of step S102 may not be performed. However, also in this case, correction of the distance information based on data distortion or material may be performed.

Figure 7:
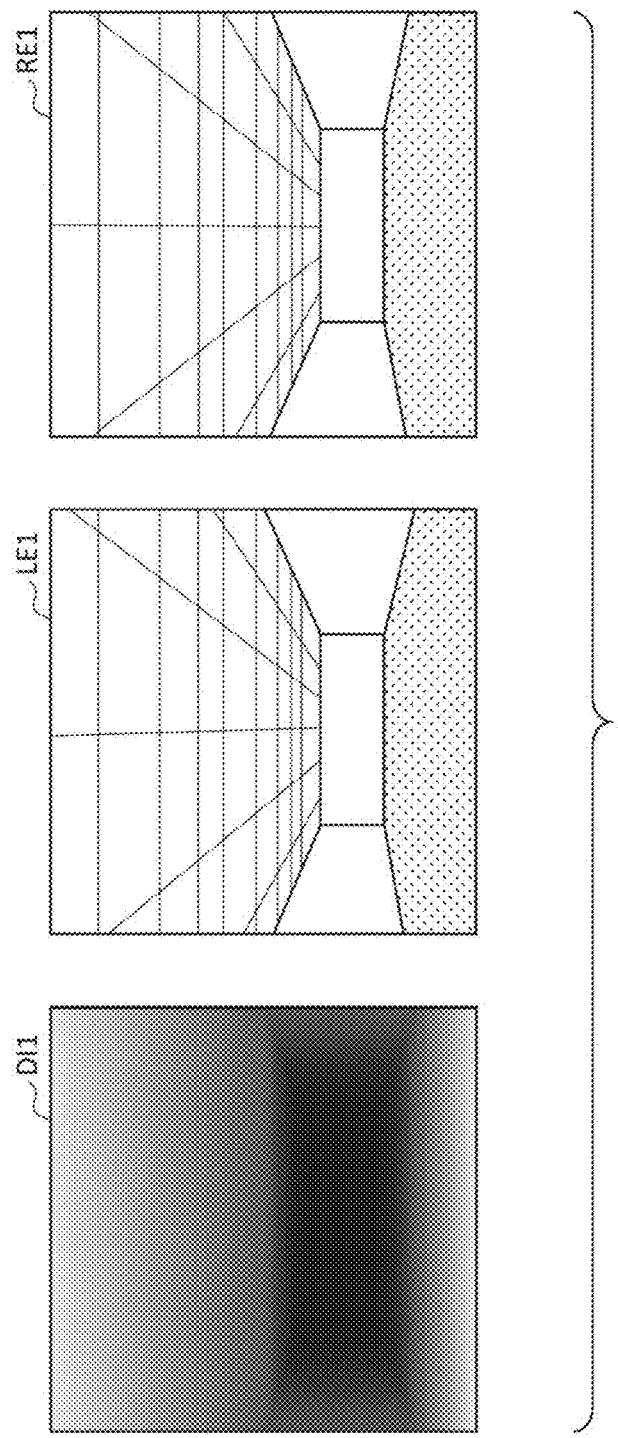
FIG. 7 is a diagram showing a first example of an image and distance information acquired in the position estimating process.

FIG. 7 shows a first example of stereo camera images captured indoors and distance information calculated from the stereo camera images.

The three images shown in FIG. 7 are distance information DI1, a left eye (i.e., left camera) image LE1, and a right eye (i.e., right camera) image RE1 in order from the left. Methods for calculating the distance information by stereo matching two images are generally known, and the distance information DI1 is calculated from the LE1 and the RE1 by using such methods, and is hereinafter also referred to as the distance image. The distance image indicates that the higher the luminance (i.e., white), the closer to the camera, and the lower the luminance (i.e., black), the farther from the camera. The distance image also corresponds to the sensor information with one-to-one.

Figure 8:
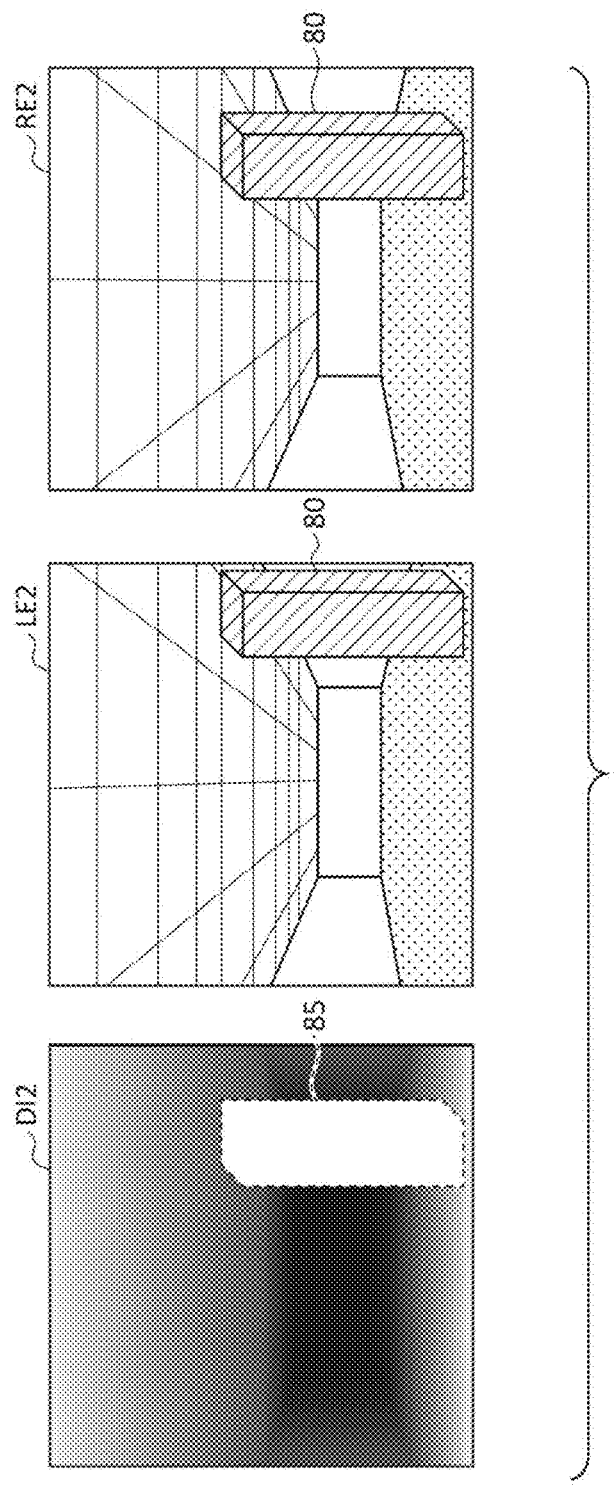
FIG. 8 is a diagram showing a second example of an image and distance information acquired in the position estimating process.

FIG. 8 shows a second example of stereo camera images and distance information. The three images shown in FIG. 8 are a distance information DI2, a left eye (i.e., left camera) image LE2, and a right eye (i.e., right camera) image RE2 in order from the left. Here, in the left-eye image LE2 and the right-eye image RE2 of FIG. 8, a box 80 shown in indoor space near the camera to hide a part of the ceiling or the wall. Therefore, the distance image DI2 of FIG. 8 includes a high-luminance region 85 at a position corresponding to the box 80.

In FIGS. 7 and 8, the distance image is generated at the same resolution as the camera image, but the distance image may be calculated in units obtained by dividing the image, for example, in units of blocks. The calculation of the distance by stereo matching includes obtaining a parallax amount of each pixel or region of two or more images by matching the images and converting the parallax amount into distance information.

Figure 9:
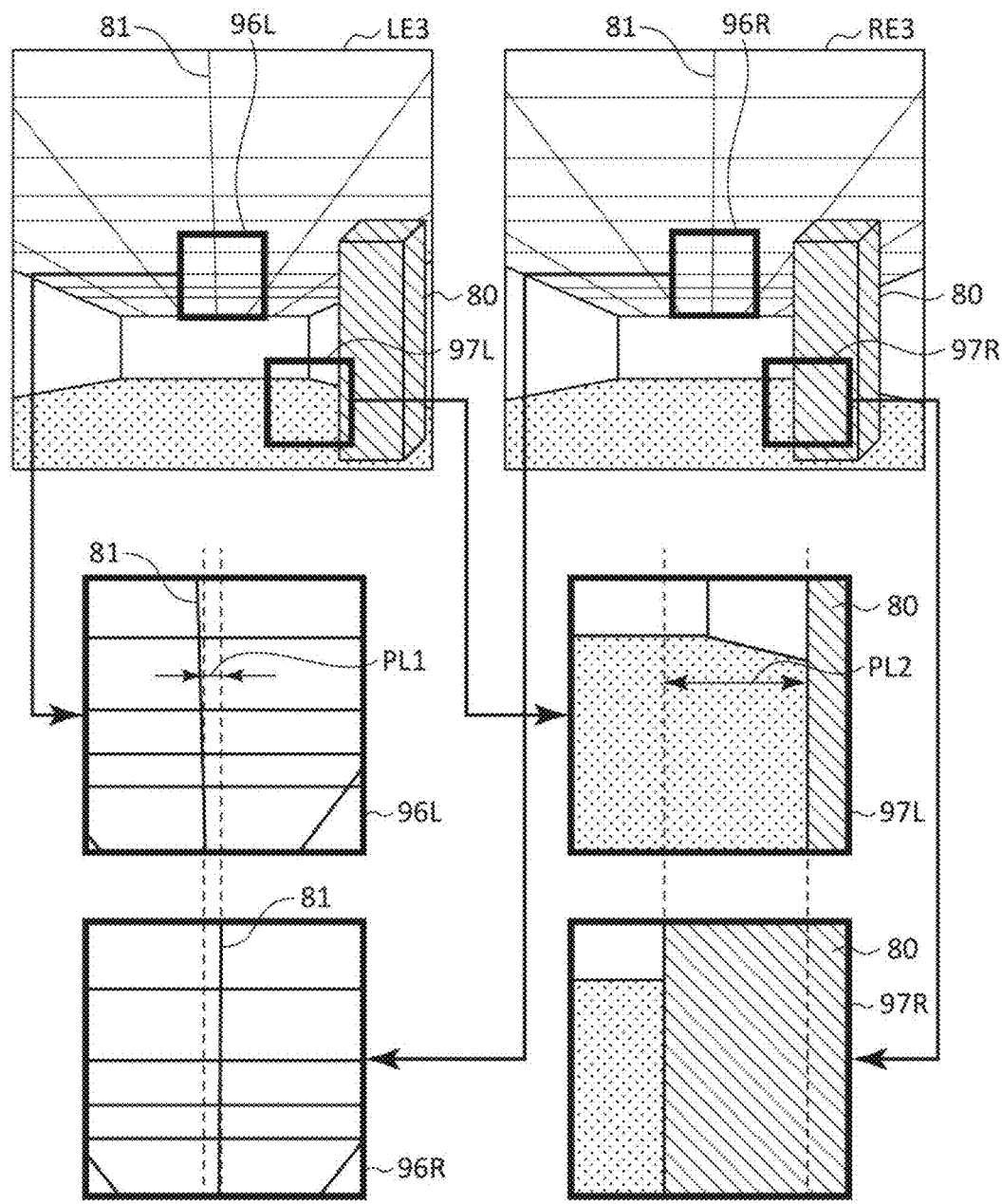
FIG. 9 is a diagram showing a relationship between a parallax and a distance in the image shown in FIG. 8.

FIG. 9 shows an example of the relationship between the parallax amount and the distance. FIG. 9 shows a left-eye image LE3 and a right-eye image RE3, and each image includes a box 80 and a ceiling line 81. Boxes 96L and 96R and boxes 97L and 97R are drawn at the same position on the image for comparison. Here, when the box 96L and the box 96R are compared with each other, it may be seen that a slight positional gap (i.e., parallax) PL1 occurs in the ceiling line 81 of the captured image. On the other hand, when the box 97L and the box 97R are compared with each other, a parallax PL2 larger than the parallax PL1 occurs in the box 80 on the front side (i.e., near side). As described above, the relationship between the parallax amount and the distance is such that the parallax amount decreases as the distance increases, and the parallax amount increases as the distance decreases.

In an embodiment, it may be not necessary to calculate the distance information in all regions of the stereo image. For example, the position estimating apparatus 1 calculates the evaluation information from the distance information based on whether the distance from the camera is long or short. Therefore, the distance information may include information indicating whether the distance is long or short, or information indicating whether the parallax amount is large or small. As shown in FIG. 9, in order to calculate a short distance, that is, a large parallax amount, it may be necessary to perform stereo match search in a wide range in the image. On the other hand, if only a distant region is specified, it may be possible to perform a search in a narrow range and determine that a matched region is far. That is, if a search method of narrowing the search range and specifying only a distant region is used, it may be possible to calculate distance information with a much smaller amount of calculation than that of normal distance calculation.

Figure 10:
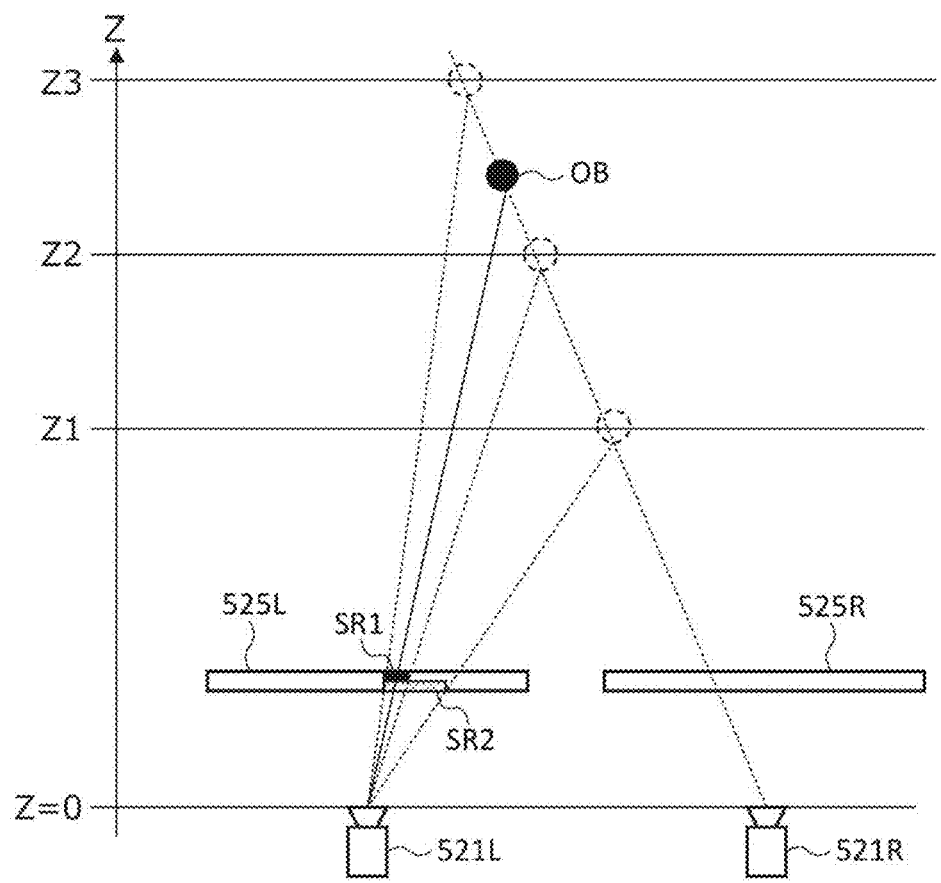
FIG. 10 is a diagram showing a relationship between distance calculation by the position estimating apparatus and a search range.

FIG. 10 shows the relationship between such a search range and distance information. FIG. 10 assumes that the distance to an object OB is calculated by a stereo camera comprising a left camera 521L and a right camera 521R. Here, it is assumed that the object OB is searched from the image of the left camera 521L with the right camera 521R as a reference. The object OB is projected onto image planes 525L and 525R of the left camera 521L and the right camera 521R, respectively, as indicated by broken lines.

First, since the distance to the object OB is unknown, a search distance needs to be assumed. When the relationship, $Z1<Z2<Z3$ exists, (I) assuming that the distance is Z1 to Z3, it is necessary to search a wide area SR2 of the left camera image plane 525L, and (II) assuming that the distance is Z2 to Z3, it is necessary to search a narrower region SR1.

The difference between (I) and (II) above is whether or not the assumed distance to the object OB to be searched is set close. That is, the search range changes according to the set assumed distance. More directly, the search range becomes narrower when considering longer distances only.

The above can be expressed by the following Formula 1:

$$Z=Bf/d \qquad \text{(Formula 1)}$$

In the Formula 1, Z is a distance from the camera to the object, d is a parallax amount (i.e., an amount of gap on the image), B is a baseline (i.e., a distance between the cameras), and f is a focal length of the camera. By transforming the Formula 1, the following Formula 2 is obtained:

$$d=Bf/Z \qquad \text{(Formula 2)}$$

Using the Formula 2, a search width $\Delta_{13}$ between Z1 and Z3 and the search width $\Delta_{23}$ between Z2 and Z3 are expressed as follows:

$$\Delta_{13} = Bf\left(\frac{1}{Z_1} - \frac{1}{Z_3}\right) \qquad \text{(Formula 3)}$$

$$\Delta_{23} = Bf\left(\frac{1}{Z_2} - \frac{1}{Z_3}\right)$$

Thus, the following Formula 4 is obtained:

$$\Delta_{13} - \Delta_{23} = \qquad \text{(Formula 4)}$$
$$Bf\left\{\left(\frac{1}{Z_1} - \frac{1}{Z_3}\right) - \left(\frac{1}{Z_2} - \frac{1}{Z_3}\right)\right\} = Bf\left(\frac{1}{Z_1} - \frac{1}{Z_2}\right) > 0$$

It shows that the search range is larger in the case of searching from a closer range.

Subsequently, in step S203 of the flowchart of FIG. 6, the evaluation information calculator 12 calculates the evaluation information for the distance information or the sensor information based on the distance information.

Figure 11:
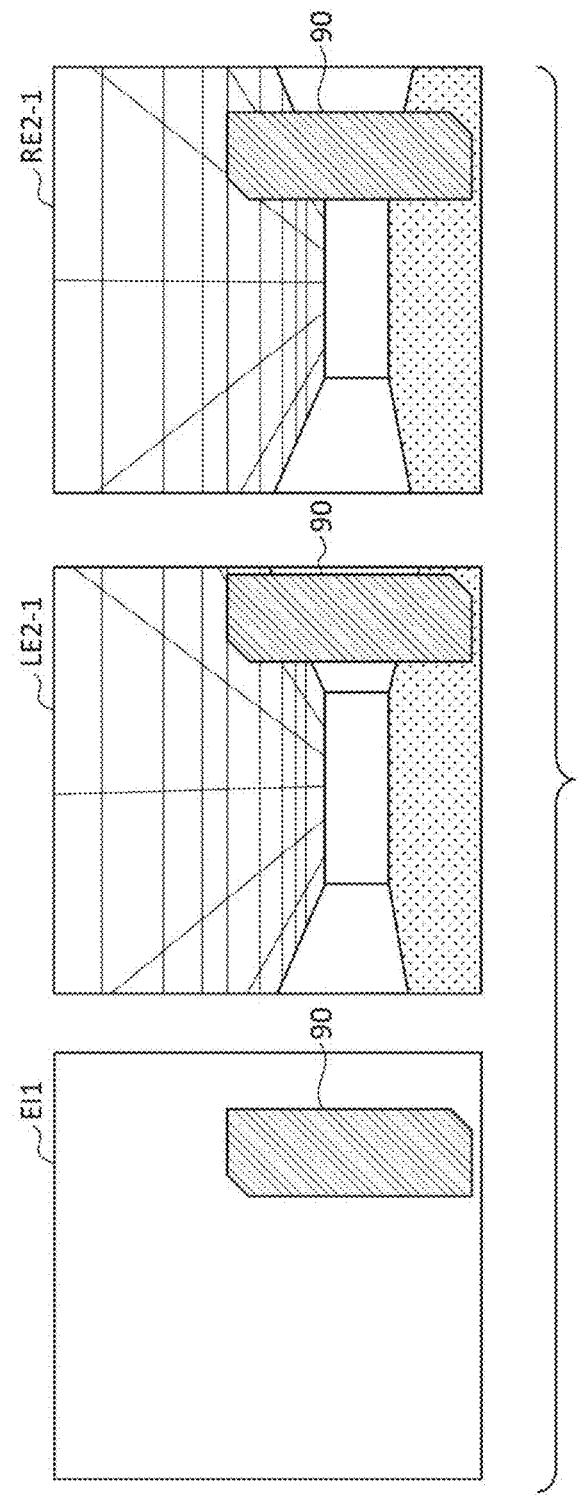
FIG. 11 is a diagram showing a first example of evaluation information calculated by the position estimating apparatus.

FIG. 11 shows an example of the evaluation information obtained from the distance image DI2 shown in FIG. 8.

In the left image EI1 of FIG. 11, a region having a high evaluation value is shown in white (e.g., evaluation value=1), and a region having a low evaluation value is shown by hatching with diagonal lines (e.g., evaluation value=0), and the left image EI1 corresponds to the sensor information. The evaluation value is low only in the region 90 of the box. The central image LE2-1 and the right image RE2-1 in FIG. 11 respectively show images in which the evaluation information EI1 (here, the region 90) is superimposed on the left-eye image and the right-eye image.

In FIG. 11, a distance D is set as a threshold value, and an evaluation value of a region closer to the distance D is 0, and an evaluation value of a region farther from the distance D is 1. The threshold value D is preferably set in accordance with the distance to the ceiling or the wall surface. For example, in the case of a building having a ceiling of 2 meters, if D is set to 1.8 meters or the like, it is possible to reliably distinguish the ceiling from the other objects. Even when there is no information in the building, a method of collecting a plurality of images in the building and setting the threshold value from the distribution of the distance information is also conceivable. Although the evaluation value is expressed by two values in FIG. 11, the evaluation value may be expressed by multiple values, a method may be used as long as the evaluation value becomes lower as the distance becomes closer.

The evaluation information may not need to be obtained in units of pixels, but may be obtained in units of regions having a certain area.

Figure 12:
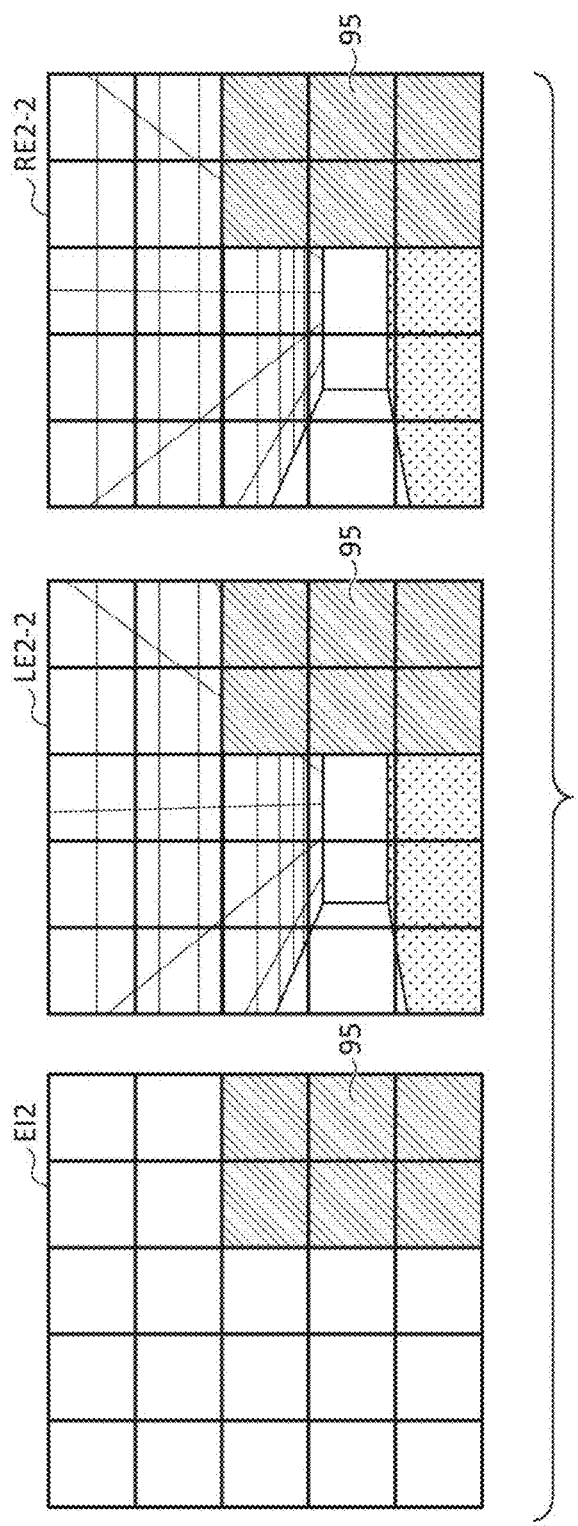
FIG. 12 is a diagram showing a second example of evaluation information calculated by the position estimating apparatus.

FIG. 12 shows an example of evaluation information obtained in such units of regions. FIG. 12 shows evaluation information obtained by dividing an image into 5×5 block areas. As in FIG. 11, the left image in FIG. 12 represents the evaluation information EI2, and the center image LE2-2 and the right image RE2-2 in FIG. 12 respectively show images in which the evaluation information EI2 is superimposed on the left-eye image and the right-eye image. As in FIG. 11, a region 95 having a low evaluation value is shown as a hatched area. There are various methods for determining the evaluation value of the block area, and for example, an average value, a minimum value, a maximum value, a median value, or the like may be used to represent each area. Unless otherwise specified, the term "unit of region" includes both the unit of pixel and the unit of region having the certain area.

Next, in step S204, the position estimator 22 specifies a region having an evaluation value higher than a predetermined threshold value in the image, as a region to be used for position estimation. In other words, the position estimator 22 specifies the region 90 having a low evaluation value shown in FIG. 11 or the region 95 having a low evaluation value shown in FIG. 12 as a region in which feature point is not detected.

In step S205, the position estimator 22 detects feature points from the region to be used for position estimation specified in step S204 in the image acquired by the acquisition unit 21, in the same manner as described in the process of generating the reference dictionaries. The position estimator 22 may detect the feature points by using SIFT, AKAZE, or the like.

In step S206, the position estimator 22 calculates a feature amount from the detected feature points. The position estimator 22 may calculate the feature amount in accordance with the method used for the feature point detection.

In step S207, the position estimator 22 performs feature point matching between the image of the target position and the image of the capturing position around the target position, which are registered in the reference dictionary stored in the dictionary storage 30, and the image acquired by the acquisition unit 21. Specifically, the position estimator 22 matches the feature points so that the difference between the feature amounts is minimized.

Here, when a plurality of target positions is registered in the reference dictionary, any one of the target positions needs to be selected. The target position may be selected by either (1) a certain method performed by another system installed in the movable apparatus 50 in advance, or (2) a method in which the position of the movable apparatus 50 is determined based on all target positions registered in the reference dictionary so as to result in the best estimation result.

In step S208, the position estimator 22 calculates a relative position using PnP (Perspective n-Point) from the relationship between the three dimensional (3D) point group of feature points registered in the reference dictionary and the associated two dimensional (2D) points. Then, the position estimator 22 determines the position of the movable apparatus 50 viewed from the target position. Thereafter, the process of FIG. 6 ends. The process of FIG. 6 may be performed again at the timing of acquisition of the next sensor information by the acquisition unit 21.

Figure 13:
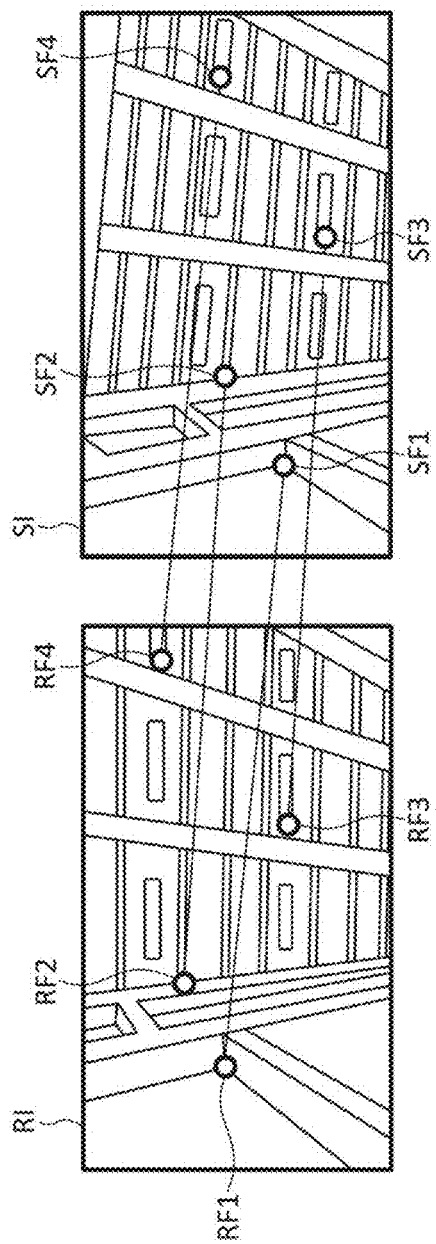
FIG. 13 is a diagram showing feature point matching by the position estimating apparatus.

FIG. 13 is a diagram showing an example of feature point matching performed by the position estimator 22. The image RI on the left side of FIG. 13 is an image registered in the reference dictionary, and the image SI on the right side is an image acquired for position estimation. The image SI may be either the left or right image acquired by the stereo camera. For each of the feature points (RF1 to RF4) in the image RI registered in the reference dictionary, the feature points (SF1 to SF4) in the acquired image SI are associated with each other.

As described above, the position estimating apparatus 1 acquires an image of the surrounding environment of the movable apparatus 50, calculates an evaluation value indicating the suitability of the image for each unit region of the image, and estimates the position of the movable apparatus 50 using the region of the image in which the evaluation value is higher than the first threshold. Therefore, according to the position estimating apparatus 1, even when the region having a low degree of suitability is included in the acquired image, the position estimation can be performed without the region. That is, even when occlusion occurs due to an unintended object, the position estimating apparatus 1 can exclude a region that may be a noise source on the basis of the evaluation value indicating the suitability, thereby making it possible to reduce a decrease in accuracy of position estimation due to an intervening object that exists around the movable apparatus 50.

The position estimating apparatus 1 according to the aforementioned embodiments may also obtain the distance information indicating a distance to an object present around the movable apparatus 50, and calculate the evaluation value based on the distance information. The distance information may be calculated from the images captured at different positions or may be acquired as a distance image. In addition, the distance information may be acquired only for an object present farther than a certain distance. As described above, among objects captured in an image, an object having a short distance is considered as a movable (i.e., intervening) object. Therefore, by performing the evaluation based on the distance information, it is possible to reduce the influence of such a movable object that may be a noise source, and to reduce a decrease in the accuracy of the position estimation.

The position estimating apparatus 1 according to the aforementioned embodiments may also calculate the evaluation information by: calculating a distance from the movable apparatus 50 to an object present at a distance larger than a second threshold value based on the sensor information, and determining an evaluation value representing the degree of suitability based on the distance. As a result, it is possible to search for only an object present at a distance using a threshold value appropriately set in accordance with the purpose of position estimation and the surrounding environment of the movable apparatus 50, thereby reducing the load of calculation processing and shortening the processing time.

In the above embodiments, the movable apparatus 50 and the position estimating apparatus 1 are described as separate systems. However, the movable apparatus 50 and the position estimating apparatus 1 may be integrated into a single system. A part of the functions of the position estimating apparatus 1 may be performed by another apparatus. For example, the dictionary storage 30 may be stored in a server or the like outside the position estimating apparatus 1.

Further, functional units included in the position estimating apparatus 1 may be distributed to a plurality of apparatuses, and these apparatuses may cooperate with each other to perform processing. Each functional unit may be implemented by a circuit. The circuit may be a dedicated circuit that implements a specific function, or may be a general-purpose circuit such as a processor.

The methods described above may be stored in a recording medium such as a magnetic disk (Floppy® disk, hard disk, or the like), an optical disk (CD-ROM, DVD, MO, or the like), or a semiconductor memory (ROM, RAM, flash memory, or the like) as a program (or software) that may be executed by a computer, and may also be distributed by being transmitted via a network. The program stored in the medium includes a setting program for configuring software, which includes tables and data structures as well as execution programs, to be executed by the computer in the computer. The computer that operates as the above-described apparatus reads the program recorded in the recording medium, constructs software means by a setting program in some cases, and executes the above-described processing by controlling the operation by the software means. The recording medium referred to in the present specification is not limited to a recording medium for distribution, and includes a recording medium such as a magnetic disk or a semiconductor memory provided in a computer or in a device connected via a network.

While some embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A position estimating apparatus comprising:
a memory that stores a reference image;
an interface circuit configured to communicate with a movable apparatus; and
a processor configured to:
upon receipt of at least one image captured by the movable apparatus via the interface circuit, calculate an evaluation value for each of a plurality of regions of the image, and
determine a current position of the movable apparatus by comparing the regions of the captured image where the calculated evaluation value exceeds a first threshold with the reference image.

2. The position estimating apparatus according to claim 1, wherein the evaluation value is calculated based on distance information indicating a distance from the movable apparatus to an object shown in said each of a plurality of regions of the image.

3. The position estimating apparatus according to claim 2, wherein the processor is further configured to generate the distance information from a pair of images captured by the movable apparatus.

4. The position estimating apparatus according to claim 3, wherein the distance information is a distance image generated from the pair of the captured images.

5. The position estimating apparatus according to claim 3, wherein the pair of images are captured by a stereo camera of the movable apparatus.

6. The position estimating apparatus according to claim 2, wherein a higher evaluation value is calculated for a region where a further object is shown.

7. The position estimating apparatus according to claim 2, wherein the evaluation value is calculated only for a region of the captured image where a distance to an object shown therein exceeds a second threshold.

8. The position estimating apparatus according to claim 7, wherein the second threshold is set based on a height of a particular object in a room where the movable apparatus moves.

9. The position estimating apparatus according to claim 8, wherein the particular object is a ceiling or a wall of the room.

10. The position estimating apparatus according to claim 1, wherein the processor is further configured to detect one or more feature points from the regions of the captured image where the calculated evaluation value exceeds the first threshold.

11. A method for determining a position of a movable apparatus, the method comprising:
storing a reference image;
upon receipt of at least one image captured by the movable apparatus, calculating an evaluation value for each of a plurality of regions of the image; and
determining a current position of the movable apparatus by comparing the regions of the captured image where the calculated evaluation value exceeds a first threshold with the reference image.

12. The method according to claim 11, wherein the evaluation value is calculated based on distance information indicating a distance from the movable apparatus to an object shown in said each of a plurality of regions of the image.

13. The method according to claim 12, wherein the calculating further includes generating the distance information from a pair of images captured by the movable apparatus.

14. The method according to claim 13, wherein the distance information is a distance image generated from the pair of the captured images.

15. The method according to claim 13, wherein the pair of the images are captured by a stereo camera of the movable apparatus.

16. The method according to claim 12, wherein a higher evaluation value is calculated for a region where a further object is shown.

17. The method according to claim 12, wherein the evaluation value is calculated only for a region of the captured image where a distance to an object shown therein exceeds a second threshold.

18. The method according to claim 17, wherein the second threshold is below a height of a particular object in a room where the movable apparatus moves.

19. The method according to claim 18, wherein the particular object is a ceiling or a wall of the room.

20. A non-transitory computer readable medium storing a program causing a computer to execute a method for determining a position of a movable apparatus, the method comprising:
storing a reference image;
upon receipt of at least one image captured by the movable apparatus, calculating an evaluation value for each of a plurality of regions of the image; and
determining a current position of the movable apparatus by comparing the regions of the captured image where the calculated evaluation value exceeds a first threshold with the reference image.

* * * * *